(12) United States Patent
Komaki et al.

(10) Patent No.: US 6,680,899 B2
(45) Date of Patent: Jan. 20, 2004

(54) OPTICAL INFORMATION MEDIUM

(75) Inventors: Tsuyoshi Komaki, Chuo-ku (JP); Hideki Hirata, Chuo-ku (JP); Naoki Hayashida, Chuo-ku (JP); Toshifumi Tanaka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 227 days.

(21) Appl. No.: 09/891,268

(22) Filed: Jun. 27, 2001

(65) Prior Publication Data

US 2002/0018440 A1 Feb. 14, 2002

(30) Foreign Application Priority Data

Jun. 28, 2000 (JP) ........................... 2000-195046
Jun. 11, 2001 (JP) ........................... 2001-176373

(51) Int. Cl.$^7$ ................................. G11B 7/24
(52) U.S. Cl. ........................................ 369/283
(58) Field of Search ................. 369/283; 428/694, 428/336, 408, 64.1, 64.4, 64.5; 427/127, 128, 129, 130; 430/270.13

(56) References Cited

U.S. PATENT DOCUMENTS

| | | | | |
|---|---|---|---|---|
| 4,879,710 A | * | 11/1989 | Iijima ..................... | 369/283 |
| 5,202,220 A | * | 4/1993 | Park et al. ................ | 369/283 |
| 5,510,164 A | * | 4/1996 | Best et al. ................ | 369/283 |
| 5,618,639 A | * | 4/1997 | Ohno et al. .............. | 369/283 |
| 5,654,131 A | * | 8/1997 | Fujihira et al. .......... | 369/288 |
| 5,688,574 A | * | 11/1997 | Tamura et al. ........... | 369/283 |
| 5,935,673 A | * | 8/1999 | Mueller ................... | 369/283 |
| 6,086,796 A | * | 7/2000 | Brown et al. ............. | 264/1.33 |
| 6,106,919 A | * | 8/2000 | Lee et al. ................. | 369/283 |

FOREIGN PATENT DOCUMENTS

| | | |
|---|---|---|
| JP | 2833197 | 10/1998 |
| JP | 10-320859 | 12/1998 |
| JP | 11-120613 | 4/1999 |

OTHER PUBLICATIONS

Andristi et al. "Thin Protective Film for Magnetic Discs."IEEE Transactions on Magnetics, vol. 24, No. 6, Nov. 1988. pp.* 2653–2654.*

* cited by examiner

Primary Examiner—George J. Letscher
Assistant Examiner—Christopher R Beachman
(74) Attorney, Agent, or Firm—Oblon, Spivak, McClelland, Maier & Neustadt, P.C.

(57) ABSTRACT

An optical information medium comprising a supporting substrate, an information recording area on the supporting substrate, and a light-transmitting layer covering at least the information recording area, wherein the information recording area is irradiated with the recording/reading laser beam through the light-transmitting layer, and wherein the light-transmitting layer is highly scratch resistant upon contact with the optical pickup is provided. Also provided is an optical information medium which has a scratch-resistant light transmitting layer, and which experiences reduced vibration in high-speed rotation without suffering from problems in focus servo and tracking servo. In such optical information medium, the surface of the medium on the side of the laser beam incidence at least in the part above the information recording area has a dynamic coefficient of friction of up to 0.4.

12 Claims, 2 Drawing Sheets

LASER BEAM

LASER BEAM

OPTICAL INFORMATION MEDIUM

BACKGROUND OF THE INVENTION

1. Field of the Invention

This invention relates to optical information media such as read-only optical disks and optical recording disks.

2. Description of the Related Art

Optical information media such as read-only optical disks and optical recording disks have been required to have a higher capacity by increasing the recording density for the purpose of recording and storing an enormous amount of information as in the case of motion picture information. Extensive efforts have been dedicated to the research and development of the recording at a higher density to meet such request.

Under such situation, one proposal has been use of a smaller laser beam spot with a reduced diameter in the recording and reading as in the case of DVD (Digital Versatile Disk) by reducing the wavelength used in the recording/reading and increasing the numerical aperture (NA) of the objective lens of the recording/reading optical system. When the DVD is compared to CD, the DVD has realized a recording capacity (of 4.7 GB/side) which is 6 to 8 times larger than that of the CD by reducing the recording/reading wavelength from 780 nm to 650 nm and by increasing the NA from 0.45 to 0.6.

Use of a higher NA, however, invites decrease of tilt margin. Tilt margin is tolerance for the tilting of the optical information medium in relation to the optical system, and the tilt margin is determined by the NA. When the recording/reading wavelength is $\lambda$, and the transparent substrate through which the medium is irradiated with the recording/reading beam has a thickness t, the tilt margin is proportional to $$\lambda/(t \cdot NA^3)$$

Tilting of the optical recording medium at an angle to the laser beam, namely, occurrence of the tilt results in the generation of wave front aberration (coma aberration). When the substrate has a refractive index of n and a tilt angle of $\theta$, the wave front aberration coefficient is given by $$(\tfrac{1}{2}) \cdot t \cdot \{n^2 \cdot \sin\theta \cdot \cos\theta\} \cdot NA^3/(n^2-\sin^2\theta)^{-5/2}$$

These relations indicate that decrease in the thickness t of the substrate is effective when the tilt margin is to be increased with simultaneous suppression the generation of the coma aberration. As a matter of fact, tilt margin is ensured in the case of DVD by reducing the thickness of the substrate to about half (about 0.6 mm) of the thickness of the CD (about 1.2 mm)

A structure enabling further decrease in the substrate thickness has been proposed in order to realize high quality motion picture recording for a longer period. In this structure, a substrate having normal thickness is used as a supporting substrate for ensuring rigidity of the medium, and the pits and the recording layer are formed on its surface, and a light-transmitting layer in the form of a thin substrate having a thickness of about 100 $\mu$m is formed on the recording layer. The medium is irradiated with the recording/reading beam through this light-transmitting layer. This structure enables drastic reduction in the thickness of the substrate, and high density recording by the use of a higher NA is thereby enabled. A medium having such structure is described, for example, in Japanese Patent Application Laid-Open Nos. (JP-A) 320859/1998 and 120613/1999.

The medium described in JP-A 320859/1998 is a magneto-optical recording medium, and this magneto-optical recording medium has a structure where in a metal reflective layer, a first dielectric layer, a magneto-optical recording layer, a second dielectric layer, and a light-transmitting layer are disposed on the substrate in this order. The medium described in JP-A 120613/1999 is a phase change optical recording medium wherein the medium is formed by disposing a reflective layer, a phase change recording layer, and a light-transmitting layer on the substrate in this order.

When a medium is provided with a light-transmitting layer of about 100 $\mu$m thick, use of an objective lens having a relatively high numerical aperture (NA) of, for example, about 0.85 is enabled.

Increase in the NA, however, is associated with the decrease in the focal depth, and also, with the decrease in the distance between the light-transmitting layer and the objective lens (working distance). To be more specific, in a system with the NA of 0.85, the focal depth is $\pm 0.3$ $\mu$m and the working distance is 100 to 300 $\mu$m.

The working distance can be increased by increasing the diameter of the objective lens. The increase in the diameter of the objective lens, however, should be avoided in view of reducing the size of the optical pickup. As a consequence, increase in the NA invites increased risk of the contact of the optical pickup with the light-transmitting layer due to the reduced working distance, and hence, increased risk of the failure in the light-transmitting layer. In the meanwhile, the focal depth decreases in proportion to the square of the numerical aperture NA, and increase in the NA is likely to invite instability of the focus servo. As a consequence, scratches in the light-transmitting layer formed by the contact of the layer with the optical pickup is likely to result in an increased risk of focus servo error. By the way, the objective lens of the optical pickup is generally formed from a resin or glass, and it is commonplace to provide a protector around the objective lens to thereby avoid the objective lens from becoming in contact with the medium. In the case of an objective lens comprising a resin, for example, a protector is integrally formed with the objective lens for the purpose of protecting the lens surface. In the case of the glass, a resin protector is mounted on the lens. Due to such design, it is the protector that becomes in contact with the medium in the case of the contact of the optical pickup with the medium, and the objective lens is protected from scratches. Such contact of the protector with the medium, however, leaves scratches in the light-transmitting layer, and even if the lens should escape from failure, recording and reading may become impossible by the poor focus servo.

When a high data transfer rate is to be achieved in an optical disk system, the optical disk should be rotated at an extremely high speed. For example, in a system wherein the recording/reading wavelength is about 400 nm, the numerical aperture of the objective lens of the recording/reproducing system is about 0.85, and the recording capacity is 22 GB/side, the maximum rotation speed of the optical disk should be set at about 2500 rpm at the data transfer rate of 35 Mbps, and at about 5000 rpm at the data transfer rate of 70 Mbps although the precise speed may vary depending on the type of the recording and the formatting.

An optical disk which has been loaded on an optical disk drive inevitably has a considerable eccentricity, that is, a considerable mass eccentricity in view of its removability which constitute the major feature of the optical disk, and the eccentricity may be empirically as much as about 0.01 gm at the maximum. Rotation of such eccentric disk is inevitably associated with some vibration, and while the vibration is not a serious problem at a relatively low rotation speed, rotation at a high speed of, for example, over 3000 rpm invites drastic increase in the vibration due to the eccentricity, and the resulting large surface vibration leads to an increased focus servo error. The vibration of the optical disk due to the eccentricity can be suppressed by increasing the force of clamping of the optical disk by the drive. Increase in the clamping force, however, is associated with an increase in the stress the optical disk, and such increase in the stress often exaggerates the surface vibration. In addition, an optical disk which is a removable medium should be recordable/readable on every type of optical disk drive. In other words, an optical disk is required to exhibit good recording/reading properties without relying on the clamping force of the drive.

SUMMARY OF THE INVENTION

In view of such situation, an object of the present invention is to provide an optical information medium comprising a supporting substrate, an information recording area on the supporting substrate, and a light-transmitting layer covering at least the information recording area, wherein the information recording area is irradiated with the recording/reading laser beam through the light-transmitting layer, and wherein the light-transmitting layer is highly scratch resistant upon contact with the optical pickup. Another object of the present invention is to provide an optical information medium which has a scratch-resistant light transmitting layer, and which experience reduced vibration upon high-speed rotation without suffering from problems in focus servo and tracking servo.

Such objects are attained by the present invention which provides a novel optical information medium. The medium includes a supporting substrate, an information recording area on the supporting substrate, and a light-transmitting layer covering at least the information recording area. The information recording area is irradiated with the recording/reading laser beam through the light-transmitting layer, and the surface of the medium on the side of the laser beam incidence above the information recording area has a dynamic coefficient of friction of up to 0.4.

According to one aspect of the invention, at least a part of the surface of the medium that is on the side of the laser beam incidence and that comes in contact with a clamping mechanism of the optical information medium driven has a dynamic coefficient of friction greater than that of the part above the information recording area. According to another aspect of the invention, at least a part of the surface of the medium that is on the side incident the laser beam and that comes in contact with a clamping mechanism of the optical information medium drive, has a dynamic coefficient of friction greater than 0.4.

According to further aspects of the invention, the light-transmitting layer has a thickness of 30 to 300 µm, and a lubricating layer containing a lubricant is present on the surface of the medium on the side incident the laser beam incidence, at least in the part above the information recording area. Additionally, the light-transmitting layer may contain a lubricant in every part thereof. The lubricant may be a fatty ester lubricant, a silicone lubricant, and/or a fluorolubricant.

DETAILED DESCRIPTION OF THE INVENTION

Figure 1:
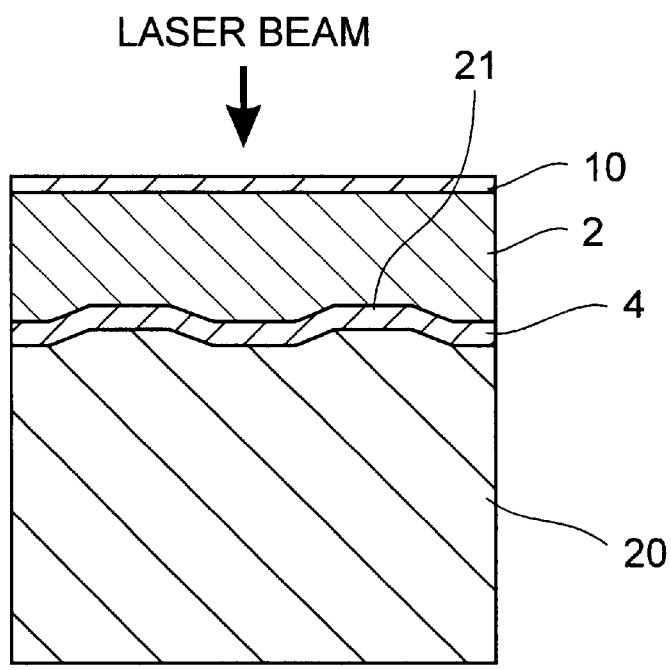
FIG. 1 is a partial cross sectional view of the optical information medium according to an embodiment of the present invention.

In the optical information medium of the present invention, at least the area of the laser beam incident surface of the medium above the information recording area has a dynamic coefficient of friction at or below a predetermined value, and this prevents scratch of the medium to be generated upon contact of the optical pickup with the laser beam incident side of the medium. Increase in focus servo error is thereby avoided.

In the optical information medium according to a preferred embodiment of the invention, of the surface of the medium on the side of the laser beam incidence, at least a part of the area that becomes in contact with the clamping means of the optical information medium drive (hereinafter referred to as the clamping area) has a dynamic coefficient of friction higher than that of the area above the information recording area. Such constitution enables secure holding of the medium by the clamping means without unduly increasing the clamping force. As a consequence, risk of slippage between the medium and the clamping means is reduced even when an eccentric medium is rotated at a high speed. Vibration of the medium is thereby reduced, and hence, increase in the vibration of the surface is suppressed to realize favorable recording/reading properties of the medium at a high data transfer rate.

Japanese Patent No. 2833197 discloses an optical disk wherein an oil-repellent, lubricating protective film layer is provided on the surface of the disk on the side of the laser beam incidence. There is also disclosed use of a copolymer of an acrylic ester having a fluorocarbon with another photo polymer resin and a phosphazene resin for the material of the protective film layer.

The merit indicated in Japanese Patent No. 2833197 with regard to the formation of the protective film layer is the reduced deposition of smudges like oil mist and ease of smudge removal in the case of the deposition of the smudge on the medium. In order to realize such effects, the protective film layer described in Japanese Patent No. 2833197 has a contact angle with oil of 40 degrees or more and a static coefficient of friction against a glass plate with surface roughness of 0.004 µm of up to 0.1. Japanese Patent No. 2833197 does not focus on the agenda of preventing the scratches formed on the disk upon its contact with the optical pickup, and Japanese Patent No. 2833197 is utterly silent about the dynamic coefficient of friction.

In the first example of Japanese Patent No. 2833197, the protective film layer is formed by coating a phosphazene resin diluted with an organic solvent on the surface of the transparent substrate through which the laser beam enters. In the second example, the protective film layer is formed by coating the transparent substrate with a copolymer resin of an acrylic ester containing a fluorocarbon with another 2P (photo polymer) resin. Japanese Patent No. 2833197, however, does not describe or indicate leaving of the clamping area of the optical disk uncovered by the protective film layer.

Figure 2:
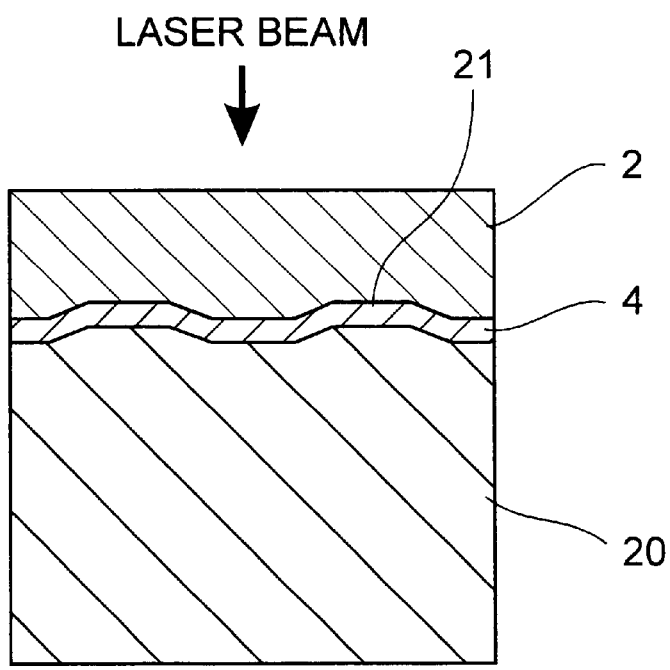
FIG. 2 is a partial cross sectional view of the optical information medium according to another embodiment of the present invention.

Typical embodiments of the optical information medium of the present invention are shown in FIGS. 1 and 2. These optical information mediums are recording mediums, and they comprise a supporting substrate 20, a recording layer 4 on the supporting substrate 20 which serves the information recording layer, and a light-transmitting layer 2 on the recording layer 4. The information-recording layer 4 is irradiated by the recording or the reading laser beam through the light-transmitting layer 2. In the medium of FIG. 1, a lubricating layer 10 containing a lubricant is provided on the light-transmitting layer 2, and the lubricating layer 10 constitutes the surface of the medium on the side of the laser beam incidence.

The present invention may be used with any type of recording material, irrespective of whether the medium is a phase change recording medium, a recording medium formed with pits, or a magneto-optical recording medium. It should be noted that the dielectric layer and the reflective layer which are generally provided on at least one side of the recording layer for the purpose of the recording layer protection or optical effects are not depicted in FIGS. 1 and 2. It should also be noted that the present invention is applicable not only to the recordable medium as shown in the drawings but also to a read-only medium. In such a case, the reflective layer covering the pit train formed simultaneously with the molding of the supporting substrate 20 constitutes the information recording layer. It should be noted that not the entire surface of the information recording layer is used for the purpose of the information recording, and in the present invention, the area in the information recording layer which is to be used for the recording or reading is designated the information recording area. In the case of a disk-shaped medium, for example, an annular area in the annular information recording layer excluding the innermost and outermost regions is used as the information recording area.

In the medium of the present invention, the surface of the medium on the laser beam incident side, namely, the surface of the lubricating layer 10 in FIG. 1 and the surface of the light-transmitting layer 2 in FIG. 2 has a dynamic coefficient of friction of up to 0.4, and preferably up to 0.3. When the surface of the laser beam incident side has a dynamic coefficient of friction within such range, scratch in the laser beam incident side of the medium by its contact with the optical pickup will be avoided or reduced, and this in turn results in the prevention of focus servo error in the recording and reading of the medium.

The dynamic coefficient of friction of the surface of the medium on the laser beam incident side is preferably as low as possible. However, increase in the thickness of the lubricating layer to some extent is required for the reduction of the dynamic coefficient of friction, and an excessively thick lubrication layer results in the irregularity of the lubricating layer upon its contact with the optical pickup. In the present invention, the recording/reading beam enters the medium through the lubricating layer, and irregularity in the lubricating layer may cause focus servo error. In view of such situation, the lubricating layer is preferably deposited to a thickness such that the dynamic coefficient of friction is 0.01 to higher.

The dynamic coefficient of friction which is limited in the present invention is preferably measured by the test procedure defined in ISO 8295:1995. The dynamic coefficient of friction, however, may be measured by other test procedures if the value measured does not significantly deviate from the value measured by ISO 8295:1995. The slider used, however, is preferably a piece of rectangular or square sheet with the sides of 1 to 20 mm, irrespective of the procedure employed for the measurement. The pressure applied to the test piece by the slider is preferably controlled to a constant value within the range of $1.0 \times 10^{-2}$ to $9.8 \times 10^{-2}$ N/cm$^2$. In the test procedure defined in ISO 8295:1995, a pair of two pieces of the test material to be tested are generally used by bringing these pieces in contact with each other. However, when it is evident that equivalent results is to be obtained, the test piece on which the slider is placed may be replaced with a piece of material different from that of the test piece to be tested, for example, a piece of smooth glass or plastic plate. Exemplary plastic materials which may be used include a thermosetting resin such as polyallylate and a thermoplastic resin such as polyacetal.

In the medium of the present invention, the dynamic coefficient of friction of the surface of the medium on the side of the laser beam incidence may be adjusted to the range as described above by providing a lubricating layer 10 as shown in FIG. 1, by incorporating a lubricant in the light-transmitting layer 2 without forming the lubricating layer as shown in FIG. 2, or by constituting the light-transmitting layer 2 itself from a material having a low dynamic coefficient of friction, for example, from a material such as a fluorohydrocarbon resin or a silicone resin.

The lubricant used in the present invention is preferably a member selected from fatty ester lubricants, silicone lubricants, and fluorolubricants, or a mixture containing two or more of such lubricants.

The fatty ester lubricant used in the present invention is not limited to any particular type. The fatty ester lubricant used, however, is preferably the one represented by the following formula I:

$$R_1\text{—COO—}R_2 \qquad (I).$$

In formula I, $R_1$ is preferably a straight-chain saturated aliphatic hydrocarbon residue containing at least 10 carbon atoms, preferably 10 to 30 carbon atoms, and more preferably 11 to 24 carbon atoms; or a branched saturated aliphatic hydrocarbon residue containing at least 10 carbon atoms, preferably 10 to 30 carbon atoms, and more preferably 10 to 24 carbon atoms. In the latter case, the number of the branch is preferably in the range of 1 to 10, and in particular, 1 to 5, and the number of carbon atoms in the branch is not limited. It is also preferable that $R_1$ is an unsaturated aliphatic hydrocarbon residue containing at least 10 carbon atoms, preferably 10 to 30 carbon atoms, and more preferably 12 to 24 carbon atoms. In this case, the number of double bonds in the unsaturated aliphatic hydrocarbon residue is preferably 1 to 3, and more preferably 1 to 2. The position of the double bond is arbitrary, and the unsaturated aliphatic hydrocarbon residue is preferably a straight chain hydrocarbon.

In formula I, $R_2$ is preferably a branched saturated aliphatic hydrocarbon residue containing at least 10 carbon atoms, preferably 10 to 30 carbon atoms, and more preferably 10 to 24 carbon atoms. The number of the branch is preferably in the range of 1 to 10, and in particular, 1 to 5, and the number of carbon atoms in the branch is not limited. It is also preferable that $R_2$ is an unsaturated aliphatic hydrocarbon residue containing at least 10 carbon atoms, preferably 10 to 30 carbon atoms, and more preferably 12 to 24 carbon atoms. In this case, the number of double bonds in the unsaturated aliphatic hydrocarbon residue is preferably 1 to 3, and more preferably 1 to 2. The position of the double bond is arbitrary, and the unsaturated aliphatic hydrocarbon residue is preferably a straight chain hydrocarbon.

Among these, the most preferred are the fatty ester lubricants wherein $R_1$ is a straight-chain saturated aliphatic hydrocarbon residue and $R_2$ is a branched saturated aliphatic hydrocarbon residue since they exhibit minimized degradation of properties under high-temperature storage and use as well as low friction coefficient. It should be noted that such fatty ester lubricant is preferably liquid at room temperature, and may preferably have a melting point of −40° C. to 20° C., and more preferably, −30° C. to 10° C. In addition, the fatty ester lubricant may preferably have a total number of the carbon atoms of about 20 to 40.

Exemplary such fatty ester lubricants include higher fatty esters such as butyl stearate and butyl myristate and their derivatives.

The silicone lubricant used in the present invention is not limited to any particular type, and exemplary such lubricants include silicone oils such as dimethylsilicone oil and modified products thereof. The silicone lubricant may preferably have a viscosity of 1,000 to 100,000 cP.

The fluorolubricant used in the present invention is not limited to any particular type, and exemplary preferable fluorolubricants are polyethers having a fluoroalkylene and their derivatives. Among these, the preferred are perfluoroether and derivatives thereof (for example, FOMBLIN and GALDEN manufactured by AUSIMONT, and DEMNUM manufactured by Daikin Industries, Ltd.), and trifluorochroloethylene polymer (for example, Daifloil manufactured by Daikin Industries, Ltd.). Exemplary derivatives of the polyether having a fluoroalkylene include polyether having hydroxyl, carboxyl, or isocyanate group introduced at its terminal modified with isocyanate, carboxyl, alcohol, or ester.

Next, the constitution of the medium of the present invention is described in detail.

The supporting substrate 20 is provided for the purpose of maintaining the rigidity of the medium. The thickness of the supporting substrate 20 is generally in the range of 0.2 to 1.2 mm, and preferably, in the range of 0.4 to 1.2 mm, and the supporting substrate 20 may be either transparent or non-transparent. Although the supporting substrate 20 may comprise a resin as in the case of typical optical recording medium, the supporting substrate 20 may also comprise a glass. The guide grooves 21 generally provided in the optical recording medium may be provided in the present invention by transcription of the configuration of the grooves formed in the supporting substrate 20 to the layers formed thereon as shown in the drawings. The groove 21 is the area located on the side of the laser beam incidence, and the area between the adjacent two grooves are called land.

The light-transmitting layer 2 has a light transmittance sufficient for transmitting the laser beam. The light-transmitting layer 2 may comprise a resin plate or a glass plate of the thickness substantially equivalent to that of the supporting substrate 20. The present invention, however, is particularly effective when the medium is used with an optical pickup of high NA, that is, in the case wherein the working distance is short and the focal depth is small. Accordingly, reduction in the thickness of the light-transmitting layer 2 is highly desired as in the case of the light-transmitting layer described in JP-A 320859/1998, supra. The thickness of the light-transmitting layer is preferably in the range of 30 to 300 μm. When the light-transmitting layer is thinner than this range, the medium will suffer from the optical effects caused by the dust on the surface of the light-transmitting layer. An excessively thick light-transmitting layer, on the other hand, will result in the difficulty of enabling the high density recording by increasing the NA.

The thin light-transmitting substrate may be provided, for example, by adhering a light-transmitting sheet comprising a light-transmitting resin on the information recording layer 4 by means of an adhesive or a pressure-sensitive adhesive, or by forming the light-transmitting layer 2 on the information recording layer 4 by spin coating, dipping or other coating method. The material used for the light-transmitting sheet is not limited to any particular material. The light-transmitting sheet, however, may preferably comprise a polycarbonate, a polyarylate, or a cycloolefin polymer. The light-transmitting resin used in the coating on the information recording layer 4 is also not limited. The resin used, however, is preferably an active energy beam-curable resin, and in particular, a UV-curable resin in consideration of the productivity and reliability.

The lubricating layer 10 may preferably have a thickness of 50 to 300 nm, and more preferably, 50 to 200 nm. When the lubricating layer is too thin, the dynamic coefficient of friction will not be sufficiently reduced. On the other hand, an excessively thick lubricating layer will invite irregularity of the lubricating layer upon contact with the optical pickup, and such irregularity will result in a considerable noise of focus error signal.

The lubricating layer 10 maybe formed by various processes. It is, however, preferable to form the lubricating layer by direct coating of the lubricant, or by dissolving or dispersing the lubricant in a solvent to prepare the coating solution for coating on the medium surface. The coating method is not limited, and the coating may be accomplished by spin coating, dipping, and the like.

When no lubricating layer 10 is provided as in the case of the embodiment shown in FIG. 2 by incorporating the lubricant in the light-transmitting layer 2, the content of the lubricant in the light-transmitting layer may be determined so that the light-transmitting layer exhibits sufficiently low dynamic coefficient of friction. The content may vary by the type of the lubricant used. The content, however, is preferably 0.1 to 20 mass %, and more preferably 0.5 to 10 mass %. When the content of the lubricant is too low, the effect of reducing the friction will be insufficient. On the other hand, an excessively high content of the lubricant will result in an insufficient dispersion of the lubricant, and in the case when the light-transmitting layer is formed from an active energy beam-curable resin, the layer will suffer from an increased risk of insufficient curing.

When a light-transmitting layer containing a lubricant is to be formed, such layer may be formed by kneading the lubricant in an active energy beam-curable resin such as UV-curable resin or dissolving or dispersing the lubricant in a resin solution to thereby form a coating solution, and coating the thus prepared coating solution on the surface and curing the resulting layer with an active energy beam.

It is preferable in the present invention that, of the surface of the medium on the side of the laser beam incidence, at least a part, and preferably all of the area that becomes in contact with the clamping means of the medium drive (clamping area) has a dynamic coefficient of friction higher than that of the area above the information recording area. Such constitution will reduce the risk of slippage between the clamping means and the medium, and hence, vibration generated in the rotation of the medium at a high speed. The member that becomes in contact with the laser beam incident side of the medium in the clamping means is a disk-shaped member generally referred to as the clamping stage.

Figure 3:
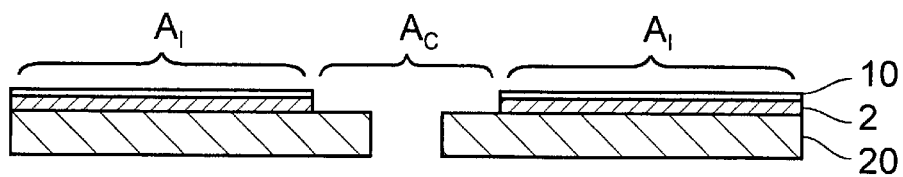
FIG. 3 is a cross sectional view of the optical information medium according to another embodiment of the present invention.
Figure 4:
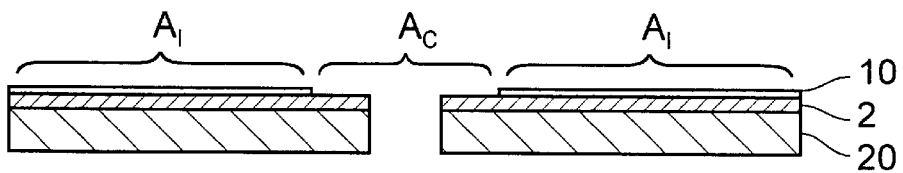
FIG. 4 is a cross sectional view of the optical information medium according to another embodiment of the present invention.
Figure 5:
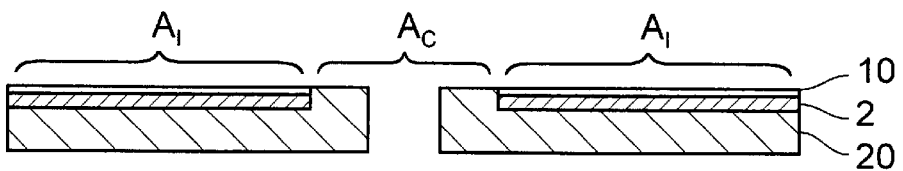
FIG. 5 is a cross sectional view of the optical information medium according to another embodiment of the present invention.

FIGS. 3, 4 and 5 show the embodiments of the optical disk having the constitution as described above. FIGS. 3, 4 and 5 are cross-sectional views showing only the end faces appearing at the section and the views in depth direction are omitted, and in addition, the information recording layer is not depicted. The optical disks illustrated have a structure comprising a supporting substrate 20, and a light-transmitting layer 2 and a lubricating layer 10 formed thereon. In all embodiments, the lubricating layer 10 covers the information recording area $A_I$ but not the clamping area $A_C$. The surface of the light-transmitting layer 2 or the surface of the supporting substrate 20 left exposed in the clamping area $A_C$ has a dynamic coefficient of friction which is higher than that of the lubricating layer 10. As a consequence, the dynamic coefficient of friction of the laser beam incident side of the medium is higher in the clamping area $A_C$ compared to the information recording area $A_I$. The dynamic coefficient of friction is 0.4 or higher, and preferably 0.5 or higher in at least a part, and preferably in the entire clamping area.

When the medium is to be constituted such that the clamping area has a higher dynamic coefficient of friction, the light-transmitting layer is preferably formed as described below.

When the lubricating layer 10 is to be formed on the light-transmitting layer 2 provided by adhering a resin sheet or coating a resin, and the light-transmitting layer 2 has a dynamic coefficient of friction higher than 0.4, the extent to which the light-transmitting layer 2 is formed is not particularly limited, and the light-transmitting layer 2 may be formed to leave the interior peripheral region of the medium uncovered as in the case of FIG. 3 or to extend to the periphery of the medium as shown in FIG. 4. In either case, however, the lubricating layer 10 should not extend into the clamping area $A_C$, and in this regard, it would be most convenient to form the lubricating layer 10 by spin coating wherein the coating solution is supplied at a position exterior of the clamping area $A_C$. Other coating methods are also applicable if, for example, the clamping area $A_C$ is masked.

On the other hand, when the light-transmitting layer 2 formed by adhering a resin sheet or coating a resin has a dynamic coefficient of friction of 0.4 or lower, that is, when the light-transmitting layer 2 contains a lubricant or the entire light-transmitting layer 2 is constituted from a low frictional material, the light-transmitting layer 2 should be formed to leave the inner peripheral region exposed so that the clamping area $A_C$ is uncovered by the light-transmitting layer 2 as in the case of the embodiment shown in FIG. 3. However, the light-transmitting layer 2 having a low dynamic coefficient of friction may be formed to extend to the inner periphery of the medium if the inner peripheral region of the light-transmitting layer 2 is consequently treated to increase the dynamic coefficient of friction. The dynamic coefficient of friction of the light transmitting layer can be increased, for example, by surface roughening. If the light-transmitting layer 2 has a dynamic coefficient of friction of 0.4 or lower, the lubricating layer 10 can be omitted or provided.

In the present invention, the light-transmitting layer 2 may be formed by adhering a resin sheet which has the lubricating layer 10 preliminarily formed on its surface on the supporting substrate 20. In this case, the light-transmitting layer 2 is formed by forming the lubricant layer 10 on a resin sheet of large area, and thereafter stamping or cutting out the resin sheet to the size of the medium. In this case, the light-transmitting layer 2 and the lubricant layer 10 will have an identical inner diameter and an identical outer diameter, and therefore, the inner diameter of the light-transmitting layer 2 should be larger than the outer diameter of the clamping area as shown in FIG. 3.

By the way, it is usual in current optical disk system that the surface of the optical disk on the side of the laser beam incidence is substantially flat. There is no particular critical necessity for the disk surface to be flat, but such design is the one that prevails. When the present invention is applied in the optical disk to be used in such system, the inner periphery of the light-transmitting layer 2 should be carefully designed. In the embodiment of FIG. 3, for example, the light-transmitting layer 2 is absent in the clamping area $A_C$ in the inner periphery of the medium, and the thickness of the medium is reduced in that area. When the inner peripheral area of the medium is left uncovered by the light-transmitting layer 2, the thickness of the supporting substrate 20 may be increased to the extent of the thickness of the light-transmitting layer 2 in the inner peripheral area of the medium as shown in FIG. 5 so that the surface of the medium on the laser beam incident side is flat.

EXAMPLES

Example 1

Samples of read only optical disk as shown in Table 1 were prepared by the procedure as described below.

A polycarbonate supporting substrate in the form of a disk having an outer diameter of 120 mm, an inner diameter of 15 mm, and a thickness of 1.2 mm formed with information-retaining pits was prepared, and an aluminum reflective layer was sputtered on the supporting substrate.

A light-transmitting layer was then formed by spin coating a UV curable resin (SD301 manufactured by Dainippon Ink & Chemicals, Inc.) to a thickness of 100 $\mu$m. The light-transmitting layer formed had an inner diameter of 36 mm to thereby leave the clamp area uncovered.

A lubricating layer was formed on the surface of the light-transmitting layer by spin coating a coating solution prepared by dissolving the lubricating agent shown in Table 1 with a solvent. In the spin coating, the coating solution was supplied onto the supporting substrate at a position on the exterior side of the clamping area so that the inner diameter of the lubricating layer was 36 mm. The thickness of the lubricating layer is shown in Table 1. In Table 1, the fatty ester lubricant used was butyl stearate, the silicone lubricant used was silicone oil (KF96 manufactured by Shinetsu Silicone; viscosity, 10,000 cP), and the fluorolubricant used was FOMBLIN Z60 (manufactured by AUSIMONT).

A sample for comparison purpose with no lubricating layer was also prepared.

The samples were then evaluated for their dynamic coefficient of friction in accordance with the procedure defined in ISO 8295:1995 except that a smooth polyacetal sheet was for the test piece of the side on which the sled was placed. The results are shown in Table 1.

Change in the wave form of focus error signal generated by the contact of the optical pickup with the disk was evaluated by measuring the wave form of the focus error signal before and after the contact of the optical pickup with the disk by using an optical recording medium evaluator (DDU-1000 manufactured by Pulstec) which had been modified so that the optical pickup becomes in contact with the disk during the rotation of the disk. The results shown in Table 1 are based on the criteria:

◎: no change,
○: some irregularities in the wave form after the contact,
X: considerable noise is recognized in the wave form after the contact.

TABLE 1

Light-transmitting layer: UV-curable resin

| Sample No. | Lublicant | Lublicating layer Thickness (nm) | Light-transmitting layer Lubricant content (mass %) | Dynamic coefficient of friction | Focus error signal |
|---|---|---|---|---|---|
| 101 (Comp.) | — | — | — | 0.80* | x |
| 102 | Fatty ester lubricant | 100 | — | 0.35 | ○ |
| 103 (Comp.) | Fatty ester lubricant | 30 | — | 0.55* | x |
| 104 | Silicone lubricant | 100 | — | 0.25 | ◎ |
| 105 (Comp.) | Silicone lubricant | 30 | — | 0.45* | x |
| 106 | Fluoro-lubricant | 100 | — | 0.30 | ◎ |
| 107 (Comp.) | Fluoro-lubricant | 30 | — | 0.55* | x |

*Outside the scope of the invention
Comp.: Comparative

As demonstrated in Table 1, irregularities in the focus error signal induced by the contact of the optical pickup can be reduced to a remarkable degree by limiting the dynamic coefficient of friction of the surface of the sample medium on the side of the laser beam incidence to the range of the present invention.

Example 2

The samples shown in Table 2 were prepared as in the case of the samples of Example 1 except that the light-transmitting layer was formed by adhering a polycarbonate sheet (PURE ACE manufactured by Teijin Ltd.) of 70 μm thick on the reflective layer by using a UV-curable resin (DVD-003 manufactured by Nippon Kayaku Co., Ltd.). The silicone oil used had a viscosity of 1,000 cP. As in the case of Example 1, the light-transmitting layer formed had an inner diameter of 15 mm so that the clamping area is covered with the light-transmitting layer, and the lubricating layer formed had an inner diameter of 36 mm so that the clamping area is left uncovered.

The samples prepared were evaluated as in the case of Example 1. The results are shown in Table 2.

TABLE 2

Light-transmitting layer: polycarbonate sheet

| Sample No. | Lublicant | Lublicating layer Thickness (nm) | Light-transmitting layer Lubricant content (mass %) | Dynamic coefficient of friction | Focus error signal |
|---|---|---|---|---|---|
| 201 (Comp.) | — | — | — | 0.80* | x |
| 202 | Fatty ester lubricant | 100 | — | 0.35 | ○ |

TABLE 2-continued

Light-transmitting layer: polycarbonate sheet

| Sample No. | Lublicant | Lublicating layer Thickness (nm) | Light-transmitting layer Lubricant content (mass %) | Dynamic coefficient of friction | Focus error signal |
|---|---|---|---|---|---|
| 203 (Comp.) | Fatty ester lubricant | 30 | — | 0.55* | x |
| 204 | Silicone lubricant | 100 | — | 0.25 | ◎ |
| 205 (Comp.) | Silicone lubricant | 30 | — | 0.45* | x |
| 206 | Fluoro-lubricant | 100 | — | 0.30 | ◎ |
| 207 (Comp.) | Fluoro-lubricant | 30 | — | 0.55* | x |

*Outside the scope of the invention
Comp.: Comparative

The results in Table 2 reveal that effects comparable to those of Example 1 are realized when the light-transmitting layer is formed by adhering a resin sheet.

Example 3

The samples shown in Table 3 were prepared as in the case of the samples of Example 1 except that the light-transmitting layer was formed by using a UV-curable resin containing a lubricant and the light-transmitting layer formed had a thickness of 50 μm. In the spin coating of the light-transmitting layer, the coating solution was supplied onto the supporting substrate at a position on the exterior side of the clamping area so that the inner diameter of the lubricating layer was 36 mm and to thereby leave the clamping area uncovered with the light-transmitting layer. The content of the lubricant in the light-transmitting layer is shown in Table 3. A sample for comparison purpose having the light-transmitting layer formed from a UV-curable resin containing no lubricant was also prepared.

In Table 3, the resin containing the silicone lubricant used was HOD3200S manufactured by Nippon Kayaku Co., Ltd., the resin containing the fluorolubricant used was HOD3200F manufactured by Nippon Kayaku Co., Ltd., and the resin containing no lubricant used was HOD3200 manufactured by Nippon Kayaku Co., Ltd.

TABLE 3

Light-transmitting layer: UV-curable resin

| Sample No. | Lublicant | Lublicating layer Thickness (nm) | Light-transmitting layer Lubricant content (mass %) | Dynamic coefficient of friction | Focus error signal |
|---|---|---|---|---|---|
| 301 (Comp.) | — | — | — | 0.80* | x |
| 302 | Silicone lubricant | — | 0.5 | 0.35 | ○ |
| 303 (Comp.) | Silicone lubricant | — | 0.05 | 0.45* | x |
| 304 | Fluoro-lubricant | — | 0.5 | 0.40 | ○ |
| 305 (Comp.) | Fluoro-lubricant | — | 0.05 | 0.50* | x |

*Outside the scope of the invention
Comp.: Comparative

The results in Table 3 reveal that effects of the present invention are realized when the light-transmitting layer contains the lubricant.

Example 4

In this example, influence introduced by the control of the dynamic coefficient of friction of the clamping area of the optical disk was examined.

Samples of read only optical disk were prepared by the procedure as described below.

A polycarbonate sheet of 70 μm thick which is the one used in Example 2 was coated with the fluorolubricant used in Example 2 to a thickness of about 100 nm with a bar coater to thereby form the lubricating layer. The thus coated polycarbonate sheet was then cut out in annular shape to an outer diameter of 119.5 mm and an inner diameter of 15 mm to thereby obtain the light-transmitting layer.

In the meanwhile, an aluminum reflective layer was sputtered on the surface of the disk-shaped supporting substrate which is the one used in Example 2. The light-transmitting layer 2 as described above was then adhered to the surface of the reflective layer by using an adhesive layer of 30 μm thick comprising a UV-curable resin (DVD-003 manufactured by Nippon Kayaku Co., Ltd.) to thereby obtain optical disk sample No. 401. In this sample, the clamping area was covered by the light-transmitting layer and the lubricating layer.

The thus prepared sample No. 401 and the sample No. 206 prepared in Example 2 were evaluated by the procedure as described below for the percentage of the residual error component of the focus error signal in relation to the p—p value of focus sensitivity curve. The sample was loaded on the optical disk evaluator as described above, and the disk was rotated at 1000 rpm. The focus error signal was measured under no focus servo with the distance between the sample and the optical pickup changed to thereby depict the focus sensitivity curve indicating the relation between the sample displacement and the output of the focus error signal. The focus sensitivity curve is the one which is often referred to as S-shaped curve, and this curve is described, for example, in page 81 of "Optical Disk Technology" published from Radio Technology Inc. on Feb. 10, 1989. p—p value of the output of the focus error signal, namely, the difference between the peak value on the plus side and the peak value on the minus side was determined from this focus sensitivity curve. Next, p—p value of the residual error component of the focus error signal was measured under focus servo, and then under tracking servo. The focus servo in this measurement was conducted by knife edge method. R/F was then calculated by using the p—p value of the thus obtained focus sensitivity curve as F, and using the p—p value of the residual error component of the focus error signal as R. R/F was also calculated by repeating the procedure as described above except that the sample was rotated at 4000 rpm. The results are shown in Table 4. When R/F was 10% or lower, the medium exhibited sufficiently reduced jitter in the reading as well as sufficiently reduced error in the writing.

In the optical disk evaluator, the clamping stage of the clamping means had an annular shape with an inner diameter of 20 mm and an outer diameter of 33 mm. The clamping force of the evaluator was set at 2.0 N.

TABLE 4

Light-transmitting layer: polycarbonate sheet

| Sample No. | Dynamic coefficient of friction | | R/F (%) | |
|---|---|---|---|---|
| | Clamping area | Information recording area | 1000 rpm | 4000 rpm |
| 206 | 0.80 | 0.30 | 2.53 | 7.2 |
| 401 (Comp.) | 0.30* | 0.30 | 2.48 | 10.3 |

*Outside the scope of the invention
Comp.: Comparative

The merits of the present invention are evident from Table 4. R/F in the high speed rotation is lower in the sample No. 206 wherein the dynamic coefficient of friction of the clamping area is 0.80 compared to the sample No. 401 wherein the dynamic coefficient of friction of the clamping area is 0.30. Therefore, even when sample No. 206 were rotated at a high speed for the purpose of increasing the data transfer rate, the disk will exhibit lower jitter and reduced error in the writing.

Japanese Patent Application Nos. 195046/2000 and 176373/2001 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical information medium comprising:

a supporting substrate;

an information recording area on the supporting substrate;

a light-transmitting layer covering at least the information recording area, the information recording area adopted to be irradiated with the recording/reading laser beam through the light-transmitting layer; and a surface on a side of the medium adopted to be incident the laser beam, having a dynamic coefficient of friction of up to 0.4, at least in a part above the information recording area, wherein at least a another part of the surface, adopted to come in contact with a clamping mechanism of the optical information medium drive, has a dynamic coefficient of friction greater than that of the part above the information recording area.

2. An optical information medium according to claim 1, wherein the other part of the surface has a dynamic coefficient of friction greater than 0.4.

3. An optical information medium according to claim 1, wherein said light-transmitting layer has a thickness of 30 to 300 μm.

4. An optical information medium according to claim 1, wherein the surface comprises:

a lubricating layer comprising a lubricant in the part above the information recording area.

5. An optical information medium according to claim 4, wherein said comprises a lubricant selected from the group consisting of: fatty ester lubricants, silicone lubricants, and fluorolubricants.

6. An optical information medium according to claim 1, wherein said light-transmitting layer contains a lubricant over every part thereof.

7. An optical information medium according to claim 6, wherein said lubricant a lubricant selected from the group consisting of: fatty ester lubricants, silicone lubricants, and fluorolubricants.

8. An optical information medium according to claim 2, wherein said light-transmitting layer has a thickness of 30 to 300 µm.

9. An optical information medium according to claim 2, wherein the surface comprises:
  a lubricating layer comprising a lubricant in the part above the information recording area.

10. An optical information medium according to claim 9, wherein said lubricant is selected from the group consisting of: fatty ester lubricants, silicone lubricants, and fluorolubricants.

11. An optical information medium according to claim 2, wherein said light-transmitting layer contains a lubricant over every part thereof.

12. An optical information medium according to claim 11, wherein said lubricant is selected from the group consisting of: fatty ester lubricants, silicone lubricants, and fluorolubricants.

* * * * *

UNITED STATES PATENT AND TRADEMARK OFFICE
CERTIFICATE OF CORRECTION

PATENT NO. : 6,680,899 B2
DATED : January 20, 2004
INVENTOR(S) : Tsuyoshi Komaki et al.

It is certified that error appears in the above-identified patent and that said Letters Patent is hereby corrected as shown below:

<u>Title page,</u>
Item [75], Inventors, please change inventors addresses from "Chuo-ku" to -- Tokyo --

<u>Column 14,</u>
Line 47, delete "a" before "another part".
Line 65, insert -- lubricant -- after "wherein said".

<u>Column 15,</u>
Line 5, insert -- comprises -- after "said lubricant".

Signed and Sealed this

Twenty-fifth Day of May, 2004

JON W. DUDAS
*Acting Director of the United States Patent and Trademark Office*